Patented Aug. 18, 1942

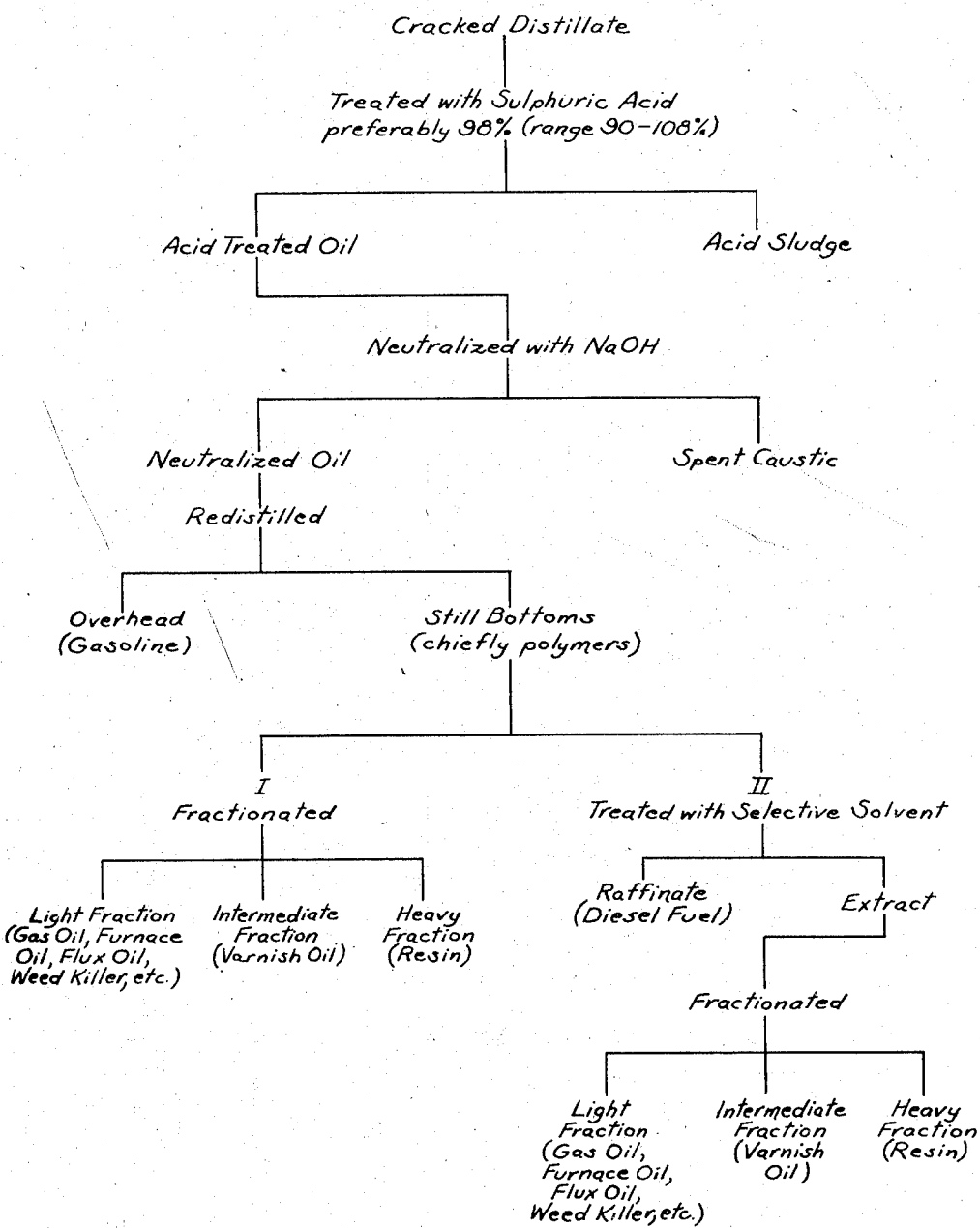

UNITED STATES PATENT OFFICE 2,293,208

PROCESS OF MAKING VARNISH OIL

Arthur Lazar, Berkeley, and William Bernard Klaus, Associated, Calif., assignors to Tide Water Associated Oil Company, San Francisco, Calif., a corporation of Delaware Application May 6, 1939, Serial No. 272,178

14 Claims. (Cl. 196—40)

This invention relates to the manufacture of drying oils from petroleum and has for its principal object the production of oils suitable for replacing, wholly or in part, drying oils of the type of linseed oil, China-wood oil, Perilla oil, and other fatty oils of unsaturated character commonly used in paints, varnishes, and other protective coatings.

Another object is the production of drying oils from a refinery by-product hitherto used chiefly as fuel.

Another object is the production of a thermoplastic resin from cracked petroleum.

Another object is the production of an oil having enhanced wetting ability for pigments used in paints, varnishes, and the like.

Other objects will be apparent from the following description.

In order to be suitable as a substitute for linseed oil, Chinawood oil, Perilla oil, and other oils of like type commonly used in paints and varnishes, a varnish oil must possess the tendency to dry to a hard film when exposed to the atmosphere, with and without the addition of a drying accelerator. Also, it must be compatible with other materials used in paints and varnishes, such as natural and synthetic resins.

Oils of drying character have previously been made from petroleum sources. As an example, it was found that the hydrocarbon polymers obtained as heavy residues from high temperature cracking possess drying characteristics. During certain high temperature cracking operations low boiling fractions of highly di-olefinic character are obtained. These di-olefins must be removed from the main portion of the light gasoline fractions obtained by cracking because they are the source of gum and resin formation due to their pronounced tendency to absorb oxygen as well as to polymerize. The removal of these di-olefins can be accomplished by vapor phase treatment with adsorbing agents. This treatment with adsorbing agents results in the formation of a conglomerate of polymers from which the oily constituents can be separated subsequently by distillation. The distillate has been recommended as a varnish oil of drying character.

According to the present invention varnish oils are produced from the heavy ends or still bottoms obtained in the refractionation of cracked distillate which has been treated with sulphuric acid for the purpose of obtaining a motor fuel of improved stability. It is well known in the art that acid treatment of cracked distillates results in the removal of unstable hydrocarbon and non-hydrocarbon material. The bulk of the undesirable ingredients in this manner is absorbed by the sulphuric acid and forms the so-called "acid sludge." The hydrocarbons participating in the reaction are largely of unsaturated or olefinic character. These are absorbed by the sulphuric acid with the formation of sulphuric acid esters which form by direct addition of the sulphuric acid molecule to the double bond. However, simultaneously with this addition reaction sulphuric acid acts also as a polymerizing and condensing agent with the result that some of the olefin molecules will combine with each other to form higher molecular compounds. These higher molecular compounds are of appreciably higher boiling range and of greater stability than the original olefins from which they have been formed. The polymers are not absorbed by the said sludge because the concentration of the sludge acid is not high enough to either dissolve them physically or attack them chemically; therefore, they remain in the acid treated distillate from which they are separated by fractionation, finished motor fuel being obtained as an overhead fraction and the polymers remaining as still bottoms. By isolating certain portions of these polymers the desired drying oils of the present invention are produced.

The invention may be more readily understood by reference to the accompanying drawing which shows, diagrammatically, the processing of cracked distillate and the recovery of varnish oil therefrom.

In the drawing it is seen that cracked distillate is first treated with sulphuric acid (of 90%–108% strength) preferably at low temperatures. The preferred methods of applying the acid are those described in United States Patents 2,052,852 and 2,155,007, issued to Edwards and Stark, which describe processes wherein a large portion of the unstable hydrocarbons are polymerized and removed in the acid sludge.

After treatment with sulphuric acid the cracked distillate is preferably neutralized with alkali. After treatment the distillate is subjected to fractionation from which an end-point gasoline is removed as overhead leaving the polymers as still bottoms.

The still bottoms contain a large proportion (eg. 40% to 90%) of polymers which, though they possess drying characteristics to a greater or less degree, are unsuited for use as varnish oils due, among other things, to their high volatility and low viscosity. While a small amount of these volatile constituents may be satisfactory, or even beneficial, in the finished drying oil, the bulk of them are removed by distillation. For this purpose the distillation should be conducted under vacuum and/or with high rates of steam to avoid decomposition at high temperatures. Prior to this distillation it is advisable to subject the still bottoms to repeated water washing in order to remove inorganic matter which might otherwise contaminate the finished products.

After removal of the lighter constituents the remaining polymers will be found to be suitable for use as a varnish oil. However, in case an oil is desired which does not contain too viscous constituents, the oil is subjected to a further distillation wherein the required viscosity oil is taken overhead. The bottoms from this second distillation will be found to be a resinous material having thermo-plastic properties suitable as a film forming substitute for natural and synthetic resins used in many protective coatings. By utilizing modern fractionating equipment it is possible to combine the two distillations and recover the volatile polymers as overhead and the desired varnish oil as a side-stream.

Varnish oils manufactured by the above method will have properties approximating those shown in the following table:

Table 1

| | |
|---|---|
| Gravity, °A. P. I. | 15–17 |
| Viscosity, S. U. @100° F. | 500–1000 |
| Viscosity, S. U. @210° F. | 50–60 |
| Aniline point, °F. | 30–60 |
| Iodine number | 80–100 |

Becomes tacky and finally hard when exposed to the atmosphere in a thin film.

While varnish oils manufactured as above are suitable for use in the preparation of paints and varnishes, oils of enhanced drying properties may be made by additional processing of the pressure distillate polymers. According to this procedure the polymers obtained from the redistillation of the acid treated pressure distillate are first treated with a selective solvent such as liquid sulphur dioxide. The art is well versed in the use of liquid sulphur dioxide to separate aromatic and unsaturated hydrocarbons from saturated hydrocarbons. Also, various other solvents are known to the art to have solvency characteristics similar to liquid sulphur dioxide, eg. aniline, phenol, dichlorethyl ether, furfural, etc. By treating the cracked distillate polymers with such a selective solvent the more reactive constituents are dissolved therein leaving the less reactive, and hence less suitable constituents undissolved as a so-called "raffinate" layer. Upon separation of the solvent layer from the raffinate and evaporation of the solvent, an "extract" is obtained which comprises the more reactive polymerized products. This extract is then subjected to distillation to remove the more volatile constituents, and if desired, the thermo-plastic resinous material as described in the case where the selective solvent was omitted.

By such selective solvent treatment followed by distillation, the most suitable constituents are isolated and thereby is produced a varnish oil having high utility in the manufacture of protective coatings. Such an oil will have properties approximating those shown in the following table:

Table 2

| | |
|---|---|
| Gravity, °A. P. I. | 12–14 |
| Viscosity, S. U. @100° F. | 1000–1500 |
| Viscosity, S. U. @210° F. | 60–70 |
| Aniline point, °F. | Below zero |
| Iodine number | 130–150 |

Becomes tacky and finally hard when exposed to the atmosphere in a thin film.

The raffinate obtained from the selective solvent treatment is found to be of a predominately saturated character and may be used as a satisfactory fuel for Diesel engines, where saturated oils are known to have more desirable ignition and combustion characteristics. It is therefore an object of this invention to produce a Diesel fuel from the bottoms obtained by redistillation of acid treated cracked distillate.

The volatile polymers distilled from the varnish oil, either with or without the pretreatment with a selective solvent, may make a satisfactory turpentine substitute or, if desired, may be used as furnace oil, flux oil, weed killer, flotation oil, etc.

In the foregoing description, the process has been explained in relation to obtaining varnish oil from the polymers resulting from the distillation of acid treated cracked distillate from which motor fuel is obtained as a main product. Though this is the preferred form of the invention, the invention also contemplates the manufacture of varnish oils by similar treatment applied to any distillate obtained from the pyrolytic conversion of hydrocarbons, whether catalysts are used or not to promote the conversion. Thus, for example, various polymerization processes yield distillates containing high concentrations of unsaturated hydrocarbons. When these distillates are subjected to sulphuric acid treatment and then redistilled, still bottoms are obtained which may be used as a source of the varnish oil according to the invention.

The varnish oils prepared according to the process are miscible with all types of fatty oils of drying character. They are compatible with most natural and synthetic gums and resins. They are soluble in most organic solvents used in the manufacture of paints, varnishes, and lacquers such as alcohols, ketones, esters, ethers, ester-ethers, chlorinated compounds and the like. Furthermore, they show excellent wetting ability for pigments used in protective coatings, particularly for those which have been found difficult to grind such as carbon black and Prussian blue.

Following are examples for the composition of paint vehicles or varnishes manufactured with this new type of varnish oil:

Example 1

| | Parts by weight |
|---|---|
| Varnish oil | 50 |
| China-wood oil | 20 |
| Bakelite resin | 10 |
| Drier (lead and manganese naphthenate) | 1 |
| Thinner (turpentine or turpentine substitute) | 19 |
| | 100 |

Example 2

| | Parts by weight |
|---|---|
| Varnish oil | 30 |
| Raw linseed oil | 40 |
| Drier (lead and manganese naphthenate) | 1 |
| Bakelite resin | 10 |
| Thinner (turpentine or turpentine substitute) | 19 |
| | 100 |

Example 3

| | Parts by weight |
|---|---|
| Varnish oil | 70 |
| Bakelite resin | 10 |
| Drier | 1 |
| Thinner | 19 |
| | 100 |

*Example 4*

|  | Parts by weight |
|---|---|
| Varnish oil (including thermo-plastic resin) | 80 |
| Drier | 1 |
| Thinner | 19 |
|  | 100 |

The procedure in cooking these varnishes is as follows:

The new varnish oil is mixed with the drying fatty oil and the mixture is gradually heated to about 400° F. The mixture is held at this temperature for about one hour and then allowed to cool to about 200° F. after which the lead manganese dryer is stirred in. Finally the thinner is added in order to reduce the viscosity of the varnish to the desired consistency.

While the above formulae are given for clear varnishes, in the manufacture of paints and enamels containing pigments the following procedure is preferred in order to facilitate the preparation. Segregate a sufficient quantity of varnish oil as a grinding medium for the pigment. If thinning and easier grinding is desired, some of the thinner may be added to the grinding mixture. After uniform grinding the balance of the ingredients is added and the cooking conducted as described above. By this procedure due to the superior wetting ability of the varish oil for the pigment compared to that of oils commonly used, the dispersion of the pigment into the vehicle is greatly facilitated.

In referring herein to the cracked distillate which is treated to remove unstable unsaturated hydrocarbons and to polymerize other unsaturated, or olefinic, hydrocarbons the invention is especially valuable when the starting cracked distillate is an end point cracked gasoline which, after treatment and redistillation, yields an end point gasoline.

However, the scope of the invention is not limited to any particular boiling range of charging material but is more specifically directed to the formation of desired polymers above the boiling range of the charging material and the recovery of such in the preferred manner which may include the recovery of gasoline of any desired end point.

We claim:

1. The process of making a varnish oil which comprises: treating a cracked petroleum hydrocarbon distillate containing unsaturated hydrocarbons with sulfuric acid of such concentration that unstable unsaturated hydrocarbons are absorbed by the acid while certain desired olefinic hydrocarbons are polymerized and remain in the unreacted distillate thus increasing its boiling range, separating the resulting acid sludge, neutralizing the thus treated distillate, distilling the thus treated distillate to remove as overhead the major portion of all fractions boiling at a lower temperature than said polymerized hydrocarbons to leave a residue containing said polymerized hydrocarbons, then fractionating said residue to recover said desired polymerized hydrocarbons as a fraction having a viscosity between about 500 and 1500 seconds Saybolt Universal at 100° F. and having the property of hardening when exposed to the atmosphere in a thin film.

2. The process of making a varnish oil which comprises: treating a cracked petroleum hydrocarbon distillate containing unsaturated hydrocarbons with sulphuric acid of such concentration that unstable unsaturated hydrocarbons are absorbed by the acid while certain desired olefinic hydrocarbons are polymerized and remain in the unreacted distillate thus increasing its boiling range, separating the resulting acid sludge, neutralizing the thus treated distillate, distilling the thus treated distillate to remove as overhead the major portion of all fractions boiling at a lower temperature than said polymerized hydrocarbons to leave a residue containing said polymerized hydrocarbons, then fractionating said residue to recover said desired polymerized hydrocarbons as a fraction having a viscosity between about 500 and 1000 seconds Saybolt Universal at 100° F. and having the property of hardening when exposed to the atmosphere in a thin film.

3. The process of making a varnish oil which comprises: treating a cracked petroleum hydrocarbon distillate containing unsaturated hydrocarbons with sufficient sulphuric acid of 90% to 108% concentration that unstable unsaturated hydrocarbons are absorbed by the acid while certain desired olefinic hydrocarbons are polymerized and remain in the unreacted distillate thus increasing its boiling range, separating the resulting acid sludge, neutralizing the thus treated distillate, distilling the thus treated distillate to remove as overhead the major portion of all fractions boiling at a lower temperature than said polymerized hydrocarbons to leave a residue containing said polymerized hydrocarbons, then fractionating said residue to recover said desired polymerized hydrocarbons as a fraction having a viscosity between about 500 and 1500 seconds Saybolt Universal at 100° F. and having the property of hardening when exposed to the atmosphere in a thin film.

4. The process of making a varnish oil which comprises: treating a cracked petroleum hydrocarbon distillate containing unsaturated hydrocarbons with sulphuric acid of such concentration that unstable unsaturated hydrocarbons are absorbed by the acid while certain desired olefinic hydrocarbons are polymerized and remain in the unreacted distillate thus increasing its boiling range, separating the resulting acid sludge, neutralizing the thus treated distillate, distilling the thus treated distillate to remove as overhead the major portion of all fractions boiling at a lower temperature than said polymerized hydrocarbons to leave a residue containing said polymerized hydrocarbons, treating said residue with a selective solvent to recover unsaturated constituents as an extract, then fractionating said extract to recover said desired polymerized hydrocarbons as a fraction having a viscosity of about 500 to 1500 seconds Saybolt Universal at 100° F. and having the property of hardening when exposed to the atmosphere in a thin film.

5. The process of making a varnish oil which comprises: treating a cracked petroleum hydrocarbon distillate containing unsaturated hydrocarbons with sulphuric acid of such concentration that unstable unsaturated hydrocarbons are absorbed by the acid while certain desired olefinic hydrocarbons are polymerized and remain in the unreacted distillate thus increasing its boiling range, separating the resulting acid sludge, neutralizing the thus treated distillate, distilling the thus treated distillate to remove as overhead the major portion of all fractions boiling at a lower temperature than said polymerized hydrocarbons to leave a residue containing said polymerized hydrocarbons, treating said residue with a selective solvent to recover unsaturated constituents as an extract, then fractionating said extract to recover said desired polymerized hydrocarbons as a fraction having a viscosity of about 1000 to 1500 seconds Saybolt Universal at 100° F. and having the property of hardening when exposed to the atmosphere in a thin film.

6. The process of making a varnish oil which comprises: treating a cracked gasoline with sulphuric acid of a concentration sufficient to absorb unstable unsaturated hydrocarbons and to polymerize certain other more stable unsaturated hydrocarbons which latter remain in the unreacted gasoline thus increasing its boiling range, separating resulting acid sludge, neutralizing the thus treated gasoline, distilling the gasoline out of the thus formed mixture to leave a fraction consisting mainly of polymers, and fractionating the polymer fraction to recover a varnish oil fraction having a viscosity between about 500 and 1500 seconds Saybolt Universal at 100° F. and having the property of hardening when exposed to the atmosphere in a thin film.

7. The process of making a varnish oil which comprises: treating a cracked petroleum hydrocarbon distillate with sulphuric acid of a concentration sufficient to absorb unstable unsaturated hydrocarbons and to polymerize certain other more stable unsaturated hydrocarbons which latter remain in the unreacted distillate thus increasing its boiling range, separating resulting acid sludge, neutralizing the polymerized distillate, removing by distillation an overhead fraction of about the same boiling range as the original untreated distillate to leave a higher boiling mainly polymerized fraction, fractionating the polymerized fraction to remove fractions having a viscosity less than about 500 seconds Saybolt Universal at 100° F., and recovering the remaining varnish oil; said varnish oil having the property of hardening when exposed to the atmosphere in a thin film.

8. The process of making a varnish oil which comprises: treating a cracked petroleum hydrocarbon distillate with sulphuric acid of a concentration sufficient to absorb unstable unsaturated hydrocarbons and to polymerize certain other more stable unsaturated hydrocarbons which latter remain in the unreacted distillate thus increasing its boiling range, separating resulting acid sludge, neutralizing the polymerized distillate, removing by distillation an overhead fraction of about the same boiling range as the original untreated distillate to leave a higher boiling mainly polymerized fraction, fractionating the polymerized fraction to remove fractions having a viscosity less than about 500 seconds Saybolt Universal at 100° F., and recovering the remaining varnish oil; said varnish oil including a fraction having a viscosity between about 500 and 1000 seconds Saybolt Universal at 100° F. and having the property of hardening when exposed to the atmosphere in a thin film.

9. The process of making a varnish oil which comprises: treating a cracked petroleum hydrocarbon distillate with sulphuric acid of a concentration sufficient to absorb unstable unsaturated hydrocarbons and to polymerize certain other more stable unsaturated hydrocarbons which latter remain in the unreacted distillate thus increasing its boiling range, separating resulting acid sludge, neutralizing the polymerized distillate, removing by distillation an overhead fraction of about the same boiling range as the original untreated distillate to leave a higher boiling mainly polymerized fraction, fractionating the polymerized fraction to remove fractions having a viscosity less than about 500 seconds Saybolt Universal at 100° F., and recovering the remaining varnish oil; said varnish oil including a fraction having a viscosity between about 500 and 1000 second Saybolt Universal at 100° F. and a resinous fraction having a viscosity greater than and 1000 seconds Saybolt Universal at 100° F. and having the property of hardening when exposed to the atmosphere in a thin film.

10. The method of making a varnish oil which comprises: treating a distillate resulting from the pyrolytic conversion of petroleum hydrocarbons with sulphuric acid of sufficient strength to polymerize but leave unabsorbed a portion of the olefin molecules therein, separating the resulting acid sludge, distilling the thus treated distillate to obtain a heavy fraction containing substantial amounts of polymers, and further distilling said heavy fraction to remove a relatively volatile fraction comprising polymers, and leave a relatively heavy fraction comprising polymers of suitable viscosity for incorporating in a protective coating as a substantial part of the vehicle thereof.

11. The method of making a varnish oil which comprises: treating a cracked petroleum distillate with sulphuric acid of 90% to 108% strength, separating the resulting acid sludge, distilling the thus treated distillate to obtain an end point gasoline as overhead, treating the resulting still bottoms with a selective solvent to separate the more reactive constituents as an extract, distilling the resulting extract to obtain a relatively volatile fraction comprising polymers, an intermediate fraction comprising polymers having a viscosity of 1000 to 1500 seconds S. U. at 100° F., and a resinous heavy fraction having thermo-plastic properties.

12. The method of making a varnish oil which comprises: treating a cracked petroleum distillate with sulphuric acid of 90% to 108% strength, separating the resulting acid sludge, distilling the thus treated distillate to obtain an end point gasoline as overhead, treating the resulting still bottoms with a selective solvent to separate the more reactive constituents as an extract, distilling the resulting extract to obtain a relatively volatile fraction comprising polymers, and a heavy fraction comprising polymers having suitable viscosity for incorporating in a protective coating as a substantial part of the vehicle thereof.

13. The method of making a varnish oil which comprises: treating a distillate resulting from the pyrolytic conversion of petroleum hydrocarbons with sulphuric acid of 90% to 108% strength, separating the resulting acid sludge, distilling the thus treated distillate to obtain a heavy fraction containing substantial amounts of polymers, treating said fraction with a selective solvent to separate the more reactive constituents as an extract, distilling the resulting extract to obtain a relatively volatile fraction comprising polymers, and a heavy fraction comprising polymers having suitable viscosity for incorporating in a protective coating as a substantial part of the vehicle thereof.

14. In a process for obtaining varnish oil from cracked distillates wherein a cracked petroleum distillate is treated with sulphuric acid to polymerize certain unsaturated hydrocarbons therein to form polymers therefrom which remain dissolved in the distillate, and the acid is removed from the distillate, and the treated distillate is distilled to recover said polymers as a heavy fraction, and said heavy fraction is processed to recover a varnish oil therefrom, the steps whch comprise: treating said heavy fraction with a selective solvent to recover unsaturated constituents thereof as an extract and fractionating said extract to obtain a fraction comprising polymers and having a viscosity greater than 500 seconds Saybolt Universal at 100° F.

ARTHUR LAZAR.
WILLIAM BERNARD KLAUS.